United States Patent
Evans et al.

(10) Patent No.: US 6,287,080 B1
(45) Date of Patent: Sep. 11, 2001

(54) ELASTOMERIC FORMULATION USED IN THE CONSTRUCTION OF LIGHTWEIGHT AIRCRAFT ENGINE FAN BLADES

(75) Inventors: Charles R. Evans, Cincinnati; Douglas D. Ward, West Chester, both of OH (US); Wendy W. Lin; Herbert S. Chao, both of Schenectady, NY (US); Joseph T. Begovich, Jr., West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/440,255

(22) Filed: Nov. 15, 1999

(51) Int. Cl.$^7$ ..................................................... F01D 5/14
(52) U.S. Cl. ................. 416/229 A; 416/233; 416/241 A; 415/200
(58) Field of Search ............................ 416/229 A, 229 R, 416/230, 232, 233, 241 A; 415/200; 264/259, 265, 328.2, 328.16, 328.17, 328.18, 331.19, 334

(56) References Cited

U.S. PATENT DOCUMENTS

| | | | |
|---|---|---|---|
| 5,295,789 | * 3/1994 | Daguet | 416/241 A |
| 5,634,771 | 6/1997 | Howard et al. | 416/241 A |
| 5,655,883 | 8/1997 | Schilling | 416/229 A |
| 5,720,597 | 2/1998 | Wang et al. | 416/229 A |
| 5,791,879 | 8/1998 | Fitzgerald et al. | 416/229 A |
| 5,839,882 | 11/1998 | Finn et al. | 416/229 A |
| 5,947,688 | * 9/1999 | Schilling et al. | 416/233 |
| 6,033,186 | * 3/2000 | Schilling et al. | 416/233 |
| 6,039,542 | * 3/2000 | Schilling et al. | 416/233 |
| 6,099,257 | * 8/2000 | Schilling et al. | 416/229 A |

* cited by examiner

Primary Examiner—Edward K. Look
Assistant Examiner—James M McAleenan
(74) Attorney, Agent, or Firm—Andrew C. Hess; David L. Narciso

(57) ABSTRACT

A formulation used in the construction of lightweight aircraft engine fan blades. The formulation comprises a polyurethane elastomer composition, which is formed from a prepolymer, a curative and an antioxidant and molded into the blades. Optionally, a hindered amine light stabilizer and/or an ultraviolet absorber may be added to the formulation.

The aircraft engine fan blade is formed from a metal, such as titanium alloy. Pockets are machined into the fan blade, so as to lessen the amount of metal used to construct the blade, thereby lowering the total weight of the blade. The formulation of the present invention is positioned in the pockets of the fan blade, so as to maintain the structural integrity of the blade against bird strikes and the like, while at the same time providing a fan blade which is significantly lighter than all-metal fan blades.

31 Claims, 3 Drawing Sheets

ELASTOMERIC FORMULATION USED IN THE CONSTRUCTION OF LIGHTWEIGHT AIRCRAFT ENGINE FAN BLADES

BACKGROUND OF THE INVENTION

1. Field of the Invention

The present invention relates generally to a gas turbine blade composed of two or more components made from different materials, and more particularly to a formulation used in the construction of a lightweight jet engine fan blade.

2. Discussion of the Prior Art

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive a front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have airfoils each including an airfoil portion attached to a shank portion. Rotor blades are those airfoils which are attached to a rotating gas turbine rotor disc. Stator vanes are stationary airfoils which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known.

Conventional airfoil designs used in the compressor section at the engine typically have airfoil portions that are made entirely of metal, such as titanium, or are made entirely of a composite. A "composite" is defined to be a material having any (metal or non-metal) fiber filament embedded in any (metal or non-metal) matrix binder, but the term "composite" does not include a metal fiber embedded in a metal matrix. The term "metal" includes alloys such as titanium Alloy 6-2-4-2. An example of a composite is a material having graphite filaments embedded in an epoxy resin.

The all-metal blades, including costly wide-chord hollow blades, are heavier in weight which results in lower fuel performance and require sturdier blade attachments, while the lighter all-composite blades are more susceptible to damage from bird ingestion events. Known hybrid blades include a composite blade having an airfoil shape which is covered by a surface cladding (with only the blade tip and the leading and trailing edge portions of the surface cladding comprising a metal) for erosion and foreign object impacts. The fan blades typically are the largest (and therefore the heaviest) blades in a gas turbine aircraft engine, and the front fan blades are usually the first to be impacted by foreign objects such as birds. What is needed is a lighter-weight gas turbine blade, and especially an aircraft-engine gas turbine fan blade, which is both lighter in weight and better resistant to damage from ingestion of foreign objects and blade out events.

SUMMARY OF THE INVENTION

The present invention is a formulation which can be cured onto a metal aircraft engine fan blade, thereby making the blade lighter, without sacrificing any of the structural integrity of the blade, that is, its resistance to foreign object impacts and the like.

The formulation comprises a polyurethane elastomer composition, formed by adding an anti-oxidant to a curative, melting the resultant composition, and mixing the composition. The curative with anti-oxidant is then mixed with a prepolymer, thereby forming a polyurethane composition, and cast into a preheated mold. The mold holding the polyurethane is placed into an oven at a predetermined temperature for a predetermined period of time, and thereafter, the polyurethane is demolded and placed into an oven at a predetermined temperature for a predetermined period of time sufficient to cure the polyurethane elastomeric composition.

Each mold is formed by a cavity within the metallic fan blade in the form of a pocket and a removable caul sheet. Each fan blade may have a plurality of pockets. The caul sheet is a composite that is affixed to the fan blade so that each of the pockets is temporarily enclosed. The caul sheet includes at least one injection port to provide a flow path for the uncured elastomer into the pockets, which have assumed the shape of a mold with the attachment of the composite caul sheet. The details of the injection system are the subject of co-pending application identified as Attorney Docket 13DV-12944 assigned to the Assignee of the present invention, incorporated herein by reference. After the polyurethane elastomeric composition is injected through at least one injector port into the mold, the elastomer is cured.

In one alternate embodiment, an anti-oxidant and/or a hindered amine light stabilizer and/or an ultraviolet absorber are optionally added to the curative. These chemical formulations assist in preventing deterioration of the blade as a result of exposure to radiation from the sun and exposure to the atmosphere as desired, thereby, when included, extending the life of the elastomer and the blade. Thus, the combination of additives can provide high temperature optimization and environmental protection.

An advantage of the present invention is that the polyurethane elastomer can be cured directly to the blade. Because the pockets form part of the mold, the polyurethane elastomer mates with essentially 100% of the available interface surface area of the blade. Because of the excellent adhesive characteristics of the elastomer to the metal, the maximization of the surface area contact between the elastomer and the metal provides for a strongly bonded insert.

Another advantage of the present invention is that since the polyurethane elastomeric insert is cured in place, there is no misfit between the pocket and the blade so that the blade having the cured elastomeric insert is aerodynamic, with little or no trimming required to remove excess material. This permits unimpeded flow of air entering the compressor while allowing the blade to operate at temperatures up to 310° F.(155° C.).

Another advantage of the present invention is that the blade having the cured elastomeric inserts is significantly lighter than a corresponding blade comprised solely of a metallic alloy, yet provides aerodynamic stability of such a blade. This weight advantage provides a corresponding improvement in fuel efficiency of the engine without adverse effects on performance.

Still another advantage of the present invention is the cost savings associated with replacing expensive metallic alloys such as titanium alloys with inexpensive polyurethane elastomers.

Finally, the present invention provides an advantage over a system in which elastomers are cured and then assembled into the pockets with an adhesive, since the time consuming and labor intensive step of adhesive bonding is eliminated and the potential for unbonded interfaces between the elastomer and the blade pocket is greatly reduced. The current system is self-adhesive and problems with fit-up are eliminated.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
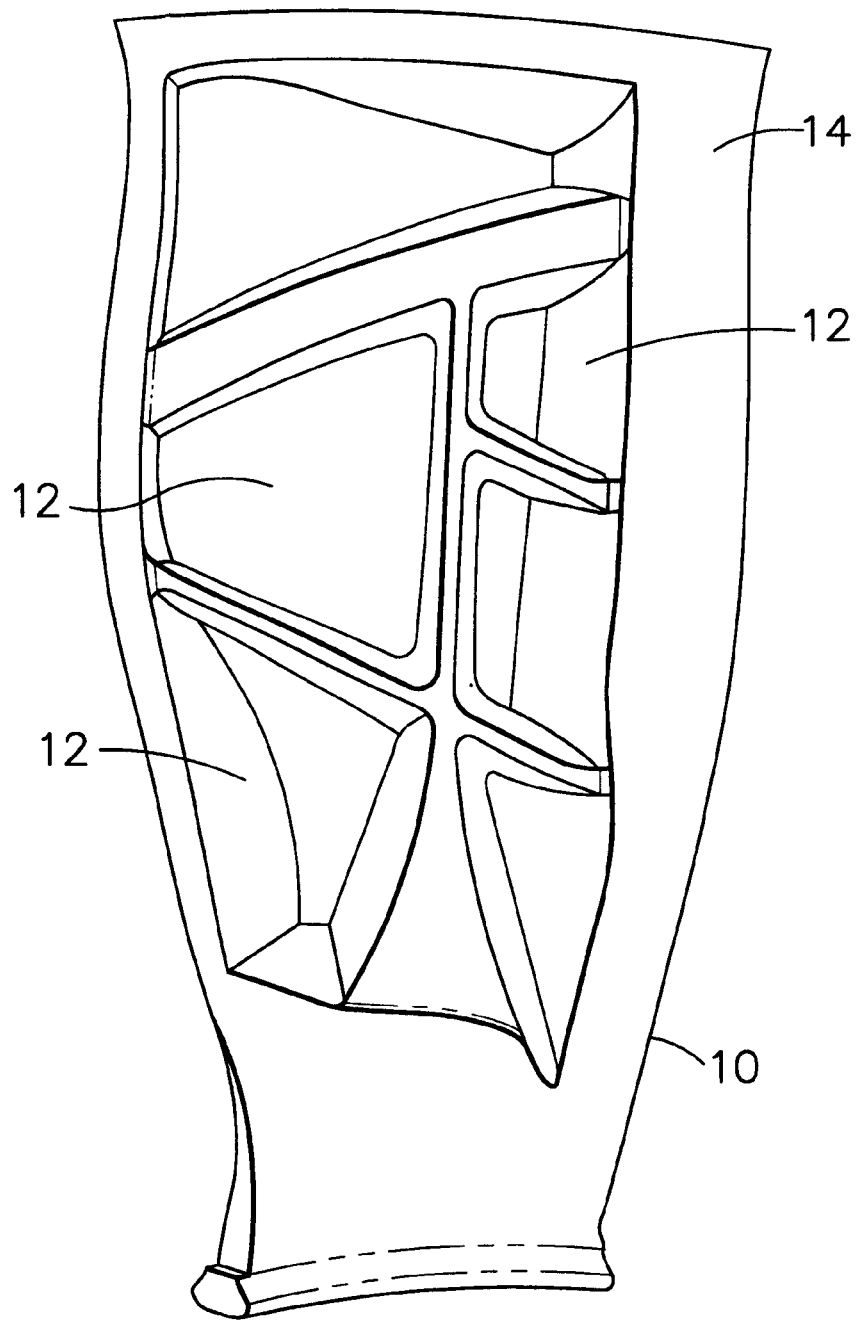
FIG. 1 is a perspective of an aircraft engine fan blade, showing pockets formed therein.
Figure 2:
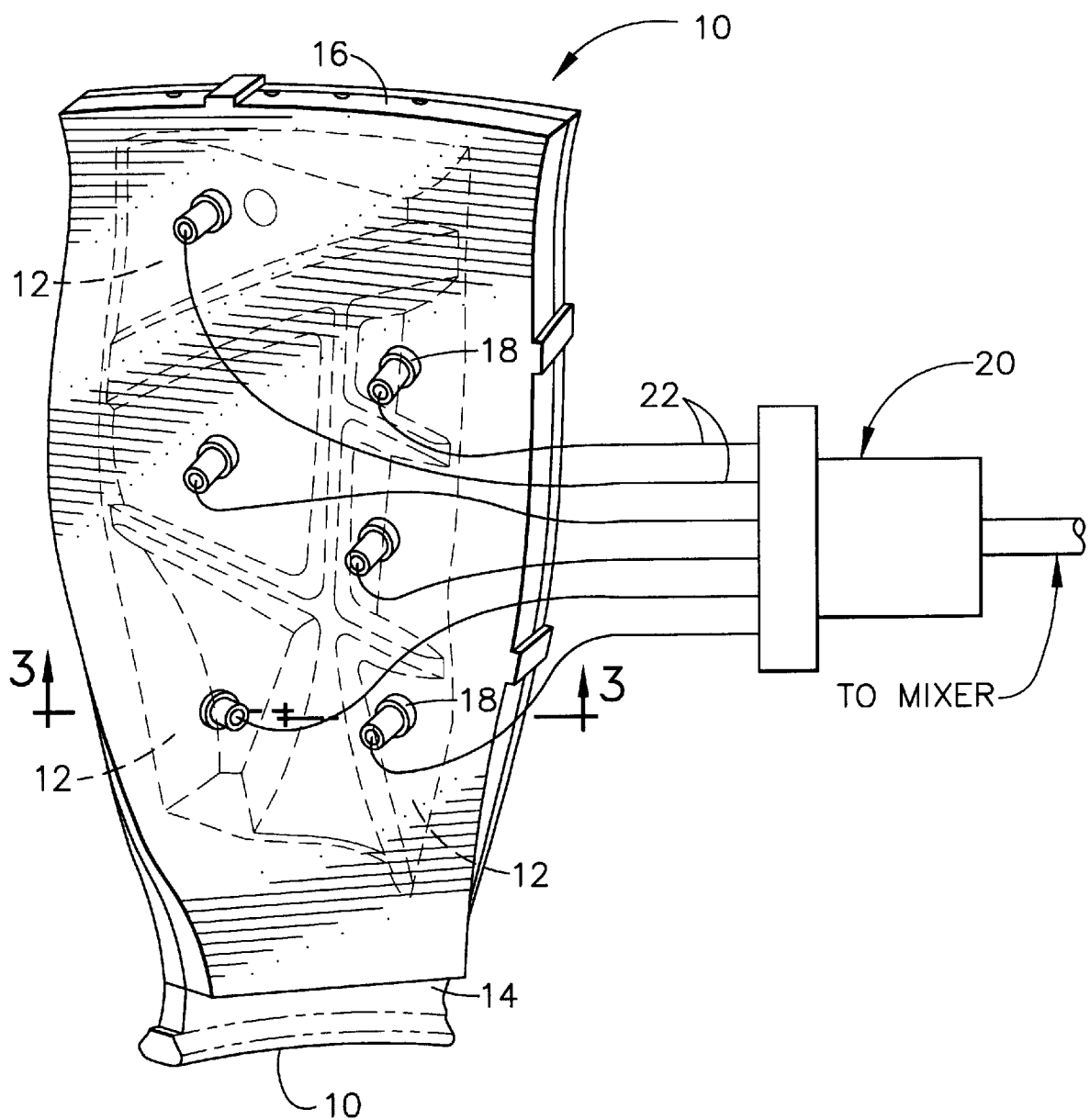
FIG. 2 is a perspective of the injection system utilized in the present invention.
Figure 3:
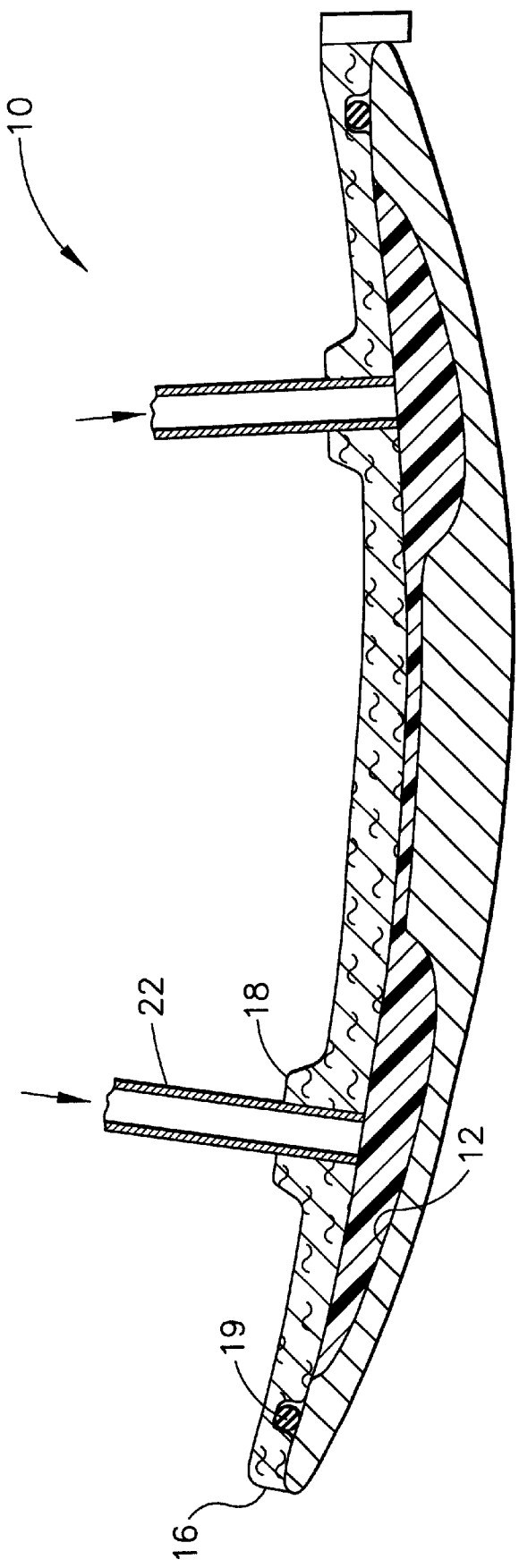
FIG. 3 is a schematic cross-sectional view of the injection system of FIG. 2, taken along lines 3—3 of FIG. 2.

Referring now to the drawings, wherein like numerals represent like elements throughout, FIG. 1 schematically shows a aircraft engine fan blade 10 used in the preferred embodiment of the present invention. The fan blade 10 is made from a metal, typically a titanium alloy such as Ti 6-2-4-2 and has a convex side and a concave side. Six pockets 12 typically are manufactured into the concave (pressure) side 14, as shown in FIG. 1. The number of pockets is dependent upon the configuration and size of the blade, and fewer or more pockets may be included as necessary. The pockets may be formed in the blade by any conventional means, such as by machining. Conveniently, the blade may be forged with the pockets being an integral part of the forged configuration. In accordance with the process of the present invention, a caul sheet 16 is fitted, such as by clamping, to the contour of the concave side 14 of fan blade 10, as shown in FIGS. 2 and 3, and is sealed with an O-ring 19, which is retained in a groove around the periphery of caul sheet 16, as shown in FIG. 3. The caul sheet 16 is preferably made from a composite material, such as carbon fiber filaments embedded in an epoxy resin. Caul sheet 16 is provided with a plurality of injection ports 18, which are located on caul sheet 16 so as to correspond with the location of pockets 12 on fan blade 10 when caul sheet 16 is fitted on to fan blade 10. Although caul sheet 16 is shown with a plurality of injection ports 18, if there is communication among the pockets 12 in the blade 10, a single injection port 18 may be utilized.

After the polyurethane elastomeric composition is prepared (described in more detail below), the composition is fed into an injection manifold 20, as shown in FIG. 2. A plurality of tubes 22 lead from injection manifold 20 to injection ports 18 on caul sheet 16, the number of tubes corresponding to the number of injection ports. The polyurethane elastomeric composition is then injected into each of the pockets 12, and the pressure is maintained until the polyurethane is cured. The polyurethane elastomer typically is cured by exposure to a preselected, elevated temperature for a preselected time. However, certain polyurethane formulations that may be used in the practice of this invention do not require elevated temperature exposure, as they air cure at ambient temperatures. The pockets must be filled with polymer and cannot be left as a void space. If left as a void space, the aerodynamic characteristics of the blade are adversely affected, thereby modifying the flow characteristics of air into the engine, which may adversely affect engine operation. As the polyurethane elastomer cures, it forms a strong bond with the metal portion of the fan blade with which it is in contact. However, it does not form a strong bond with the composite caul sheet, the caul sheet being selected or treated so as not to bond with the polyurethane elastomer as it cures.

After curing, caul sheet 16 is removed, and the cured polyurethane elastomer in pockets 12 forms a portion of the concave side of fan blade 10. This provides a fan blade which is much lighter than those blades made entirely of metal, due to the use of the low density polyurethane elastomer composition in the pockets which are molded into the metal blade. Further, because metal is nonetheless being used to a large degree, the strength of the blade and its resistance to bird strikes and other ingested foreign material is not sacrificed.

In a first preferred embodiment of the present invention, the composition which is utilized to lower the weight of the blade comprises a pre-polymer, a curative and an antioxidant. The process for incorporating the polyurethane elastomer into the blade first entails adding the anti-oxidant to the curative. These ingredients are then heated until melting occurs and they are thoroughly mixed to form a first mixture. A prepolymer of polyurethane, such as toluene di-isocyanate (TDI) capped polyether with an isocyanate functionality (NCO) content of 4.1–4.6%, is heated to its melting point. This prepolymer, also known as AIRTHANE® PET-91A, is available from Air Products and Chemicals, Inc. of Allentown, Pa. The first mixture is added to the prepolymer and thoroughly mixed to form a homogeneous second mixture. The second mixture is cast into a pre-heated mold. Referring to FIG. 2, the preheated mold is each respective cavity 12 of fan blade 10 formed after composite caul 16 is clamped and sealed to the fan blade. The fan blade is preheated to a temperature in the range of 210–250° F.(99–121° C.). The second mixture is cast into the cavities or pockets by an injector manifold 20 that injects the second mixture through injection ports 18. After the pockets are filled with polymer, the polymer is held for a sufficient period of time to permit the polymer to gel in the pockets, typically about 5 minutes. After the polymer has gelled, the fan blade is placed into an oven at a temperature of about 210–250° F.(99–121° C.) for a time sufficient to permit cross-linking to at least partially develop within the polymer to provide sufficient rigidity to allow demolding of the polyurethane, that is, the removal of the composite caul sheet and associated tooling from the back or concave side 14 of the blade 10 while leaving the polyurethane within the pockets. This time is typically from about 0.5 to about 2 hours. The blade is then placed into an oven at a temperature of about 212–320° F. (100–160° C.) for about 16–50 hours for curing. Because of the loads experienced in aircraft engine fan blades, which can cause undesirable creep of the elastomer, it is preferable to fully cross-link the elastomer during curing to develop improved creep resistance.

In this embodiment, a preferred curative used with the preferred prepolymer is a diamine, a chain extender used in polyurethanes. One such curative is a bis-dianaline available through Air Products, Inc. through an arrangement with Lonza, Inc, under the trademark LONZACURE® MCDEA. A preferred antioxidant is N-phenylbenzamine, such as Ciba IRGANOX® 5057.

The stoichiometric ratio of curative to pre-polymer is approximately 90–100%. When included, anti-oxidant is added up to 1% by weight of the overall composition weight, and preferably 0.23–0.27% by weight of the composition, and most preferably about 0.25% by weight.

In a second preferred embodiment of the present invention, a hindered amine light stabilizer (HALS), such as TINUVIN® 765, and/or an ultraviolet absorber, such as TINUVIN® 571 are added to the first mixture of antioxidant/curative mixture prior to melting. The ultraviolet (UV) absorber and the HALS are included to extend the life of the polyurethane elastomer, since it will be exposed to light and ultraviolet radiation during operation. When included, the HALS is added up to about 1% of the overall composition weight, preferably about 0.46–0.50% of the composition weight and most preferably about 0.48% by weight. When included, the UV absorber is added up to about 1% of the overall composition weight, preferably about 0.22–0.26% of the overall composition weight and most preferably about 0.24% by weight. Both the preferred HALS, TINUVIN® 765, and the preferred UV absorber, TINUVIN ® 571, are available from Ciba Specialty Chemicals of Switzerland. The processing is otherwise identical to that specified above for the first embodiment.

In preparing the prepolymer for use, such as PET-91A, it may be necessary to melt it, particularly if the prepolymer has solidified. This may be accomplished by placing a drum of the material in an oven capable of holding it at a temperature in the range of about 100–140° F.(38–60° C.) until the prepolymer is fully melted. The prepolymer is then stirred and degassed using suitable equipment. Care is taken to prevent the prepolymer from contacting moisture, as moisture will adversely affect the material.

A desired amount of curative, such as those containing amino functionality, is weighed. In the preferred embodiment a diamine curative, such as LONZACURE® MCDEA in the appropriate amount is weighed. To the curative, a preselected amount of anti-oxidant, such as N-phenylbenzamine, is added to the curative. In the preferred embodiment, about 0.24% of IRGANOX 5057® is added. The UV absorber, in the preferred embodiment TINUVIN 571®, and the HALS, in the preferred embodiment TINUVIN 765® are added in suitable amounts to provide the required environmental protection. In the preferred embodiment, these are added in the amounts of about 0.24% and 0.48% respectively. The percentages are provided based on the total weight of the polyurethane composition. This first mixture is heated to a maximum temperature of about 250° F.(121° C.) for a time sufficient to melt the mixture. The melted mixture is then stirred to assure uniformity. This first mixture is then poured through a strainer into an uncontaminated tank, which is protected with an atmosphere of nitrogen sufficient to prevent atmospheric contamination, typically about 30–40 psi of $N_2$.

The prepolymer tank and associated lines are heated to temperatures in the range of about 125–145° F.(52–63° C.), and the tank and lines for the first mixture are heated to temperatures in the range of about 215–235° F.(100–113° C.). After pumps are calibrated to assure that prepolymer and the first mixture will be dispensed to achieve a preferred stoichiometric ratio of 95–97% curative to an isocyanate functionality in the prepolymer, the lines are attached to a mixer and the materials are transferred from the tanks or containers to the mixer to assure a uniform second mixture. The second mixture is then transferred to an injection pump or injection manifold, after which it is injected onto the blade as previously discussed.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A lightweight aircraft engine fan blade construction, comprising:
    a metal blade having at least one pocket that forms a portion of a mold; and
    a formulation of a polyurethane elastomer comprised of a prepolymer of polyurethane, and a curative cured within the blade pocket, the elastomer being bonded to the metal blade surfaces to form a metal-elastomer composite.

2. A lightweight aircraft engine fan blade construction, comprising:
    a metal blade having at least one pocket that forms a portion of a mold; and
    a formulation of a polyurethane elastomer comprised of a prepolymer of polyurethane, a curative and an antioxidant cured within the blade pocket, the elastomer being bonded to the metal blade surfaces to form a metal-elastomer composite.

3. The formulation of claim 2, wherein prior to cure, said curative is present in a stoichiometric ratio to an isocyanate functionality of said prepolymer of 90–100%, and said antioxidant comprises up to about 1% by weight of said formulation.

4. The formulation of claim 3, wherein prior to cure, said curative is present in a stoichiometric ratio to said isocyanate functionality of said prepolymer of 95–97%, and said antioxidant comprises 0.23–0.27% by weight of said formulation.

5. The formulation of claim 3, wherein said prepolymer of polyurethane is a TDI capped polyether with an NCO content of 4.1–4.6%, said curative is a diamine, and said antioxidant is N-phenylbenzamine.

6. The formulation of claim 5 wherein said diamine is bis-dianiline.

7. The formulation of claim 2, wherein said formulation is cured within the blade pocket by the steps of:
    adding said antioxidant to said curative to form a first composition;
    melting said first composition;
    mixing said first composition after melting;
    mixing said prepolymer with said first composition to form a fluid second composition of polyurethane;
    forming a completed mold by adding a temporary backing over at least the concave side of the blade and covering the blade pockets;
    preheating the blade containing the mold to a first elevated temperature above ambient;
    filling the preheated mold with the fluid second composition of polyurethane and holding until gelled for a first predetermined time period;
    placing said mold holding said second composition of polyurethane into an oven and at a second predetermined holding temperature for a second predetermined time period to develop sufficient polyurethane green strength;
    demolding at least a portion of said mold from said polyurethane ; and
    placing said polyurethane into an oven at a third predetermined curing temperature for a third predetermined time period to form a rigid cross-linked polyurethane.

8. The formulation of claim 7, wherein said curative is present in a stoichiometric ratio to said prepolymer of 90–100%, and said antioxidant comprises 0.23–0.27% by weight of said formulation.

9. The formulation of claim 8, wherein said prepolymer is a TDI capped polyether with NCO content of 4.1–4.6%, said curative is a diamine, and said antioxidant is N-phenylbenzenamine.

10. The formulation of claim 7, wherein said second predetermined temperature is 210–250° F. (99–121° C.) and said second predetermined time period is thirty (30) minutes to two (2) hours.

11. The formulation of claim 7, wherein said third predetermined temperature is 212–320° F. (100–160° C.) and said third predetermined time period is 16–50 hours.

12. A formulation used in the construction of lightweight aircraft engine fan blades, comprising:
    a prepolymer;
    a curative;
    an antioxidant;
    a hindered amine light stabilizer; and
    an ultraviolet absorber.

13. The formulation of claim 12, wherein said curative is present in a stoichiometric ratio to an isocyanate functionality of said prepolymer of 90–100%, said antioxidant comprises up to 1% by weight of said formulation, said hindered amine light stabilizer comprises up to 1% by weight of said formulation, and said ultraviolet absorber comprises up to 1% by weight of said formulation.

14. The formulation of claim 12, wherein said prepolymer is a TDI capped polyether polyurethane with NCO content of 4.1–4.6%, said curative is a diamine, and said antioxidant is N-phenylbenzamine.

15. The formulation of claim 14, wherein said formulation is made by the steps of:
    adding the N-phenylbenzamine, said hindered amine light stabilizer and said ultraviolet absorber to the diamine to form a first composition;
    melting said first composition;
    mixing said first composition after melting;
    mixing the TDI capped polyether with said first composition to form a fluid second composition of polyurethane;
    forming a completed mold by adding a temporary backing over at least the concave side of the blade and covering the blade pockets;
    preheating the blade containing the mold to a first elevated temperature above ambient;
    casting the fluid second composition of polyurethane into the preheated mold and holding for a first predetermined time period until gelled;
    placing said mold holding said second composition of polyurethane into an oven and at a second predetermined holding temperature for a second predetermined time period to develop sufficient polyurethane green strength;
    demolding at least a portion of said mold from said polyurethane; and
    placing said polyurethane into an oven at a third predetermined curing temperature for a third predetermined time period to form a rigid cross-linked polyurethane bonded to the blade within the pocket.

16. The formulation of claim 15, wherein the diamine is present in a stoichiometric ratio to the TDI capped polyether of 95–97%, the N-phenylbenzamine comprises 0.23–0.27% by weight of said formulation, said hindered amine light stabilizer comprises about 0.46–0.50% by weight of said formulation, and said ultraviolet absorber comprises about 0.22–0.26% by weight of said formulation.

17. The formulation of claim 15 wherein said second predetermined temperature is 210–250° F. (99–121° C.) and said second predetermined time period is about 30 minutes to about 2 hours.

18. The formulation of claim 15, wherein said third predetermined temperature is about 212–320° F. (100–160° C.) and said third predetermined time period is about 16–50 hours.

19. A process for preparing a formulation for use in the construction of metallic lightweight aircraft engine fan blades having a convex side and a concave side, and including pockets formed into the concave side, comprising:
    melting a curative to form a fluid;
    using the blade to form a completed mold by placing a removable caul sheet over the at least concave side of the blade and covering the blade pockets, the mold formed by the blade pockets and the caul sheet;
    preheating the mold by preheating the blade to a first elevated temperature above ambient;
    adding a prepolymer of polyurethane to the fluid and mixing to form a fluid mixture;
    filling the preheated mold with fluid mixture and holding for a first predetermined time period until gelled;
    placing the blade containing the mold filled with the fluid mixture into an oven at a second predetermined temperature for a second predetermined time period to develop sufficient polyurethane green strength;
    demolding the caul sheet from the concave side of the blade; and
    placing the polyurethane into a curing oven at a third predetermined temperature for a third predetermined time period.

20. The process of claim 19 further including, prior to the steps of adding a prepolymer, the additional steps of:
    adding an antioxidant to the curative;
    melting the antioxidant and the curative to form a fluid;
    mixing the fluid.

21. The process of claim 19, wherein said curative is present in a stoichiometric ratio to an isocyanate functionality of said polyurethane prepolymer of 90–100%, and said antioxidant comprises up to about 1% by weight of said formulation.

22. The process of claim 21, wherein said curative is present in a stoichiometric ratio to said isocyanate functionality of said polyurethane prepolymer of 95–97%, and said antioxidant comprises 0.23–0.27% by weight of said formulation.

23. The process of claim 19, wherein said polyurethane prepolymer is a TDI capped polyether with an NCO content of 4.1–4.6%, said curative is a diamine, and said antioxidant is N-phenylbenzamine.

24. A process for preparing a lightweight aircraft engine fan blade, comprising:
    forming a metal fan blade, said fan blade having a concave side, a concave side and a plurality of pockets formed in said concave side;
    injecting an elastomeric formulation into said pockets, wherein said formulation comprises a polyurethane elastomer composition formed from a prepolymer of polyurethane, a curative and an optional antioxidant.

25. The process of claim 24, wherein said curative is present in a stoichiometric ratio to an isocyanate functionality of said prepolymer of 95–97%, and said antioxidant comprises 0.23–0.27% by weight of said formulation.

26. The process of claim 25, wherein said polyurethane prepolymer is a TDI capped polyether with NCO content of 4.1–4.6%, said curative is a diamine, and said antioxidant is N-phenylbenzamine.

27. The process of claim 24, wherein said formulation is made by the steps of:

adding said antioxidant to said curative to form a first composition;

melting said first composition;

mixing said first composition after melting;

mixing said polyurethane prepolymer with said first composition to form a second composition;

preheating the blade to a first elevated temperature above ambient;

injecting said second composition into the blade pockets, the blade pockets partially forming a mold that includes the pockets of the blade, and holding for a first predetermined time period until gelled;

placing the blade having pockets filled with the second composition into an oven at a second predetermined temperature for a second predetermined time period to develop sufficient polyurethane green strength; and placing said polyurethane into a curing oven at a third predetermined temperature for a third predetermined time period to cure the polyurethane.

28. The process of claim 27, wherein said second composition is injected in said pockets and positioned by the steps of:

fitting a caul sheet to said concave side of said fan blade, said caul sheet having a at least one injection port therein, said at least one injection port being positioned on said caul sheet so as to be in fluid communication with the blade pockets when said caul sheet is fitted to said fan blade;

injecting said second composition through said injection ports and into said pockets;

forming a polyurethane of said second composition; and demolding by removing said caul sheet from the concave side of the blade.

29. The process of claim 28, wherein said curative is present in a stoichiometric ratio to an isocyanate functionality of said polyurethane prepolymer of 95–97%, and said antioxidant comprises 0.23–0.27% by weight of said formulation.

30. The process of claim 29, wherein said polyurethane prepolymer is a TDI capped polyether with NCO content of 4.1–4.6%, said curative is a diamine, and said antioxidant is N-phenylbenzamine.

31. The process of claim 30, wherein said formulation is made by the steps of:

melting the diamine to form a fluid;

optionally adding N-phenylbenzamine to said curative while maintaining the mixture as a fluid;

mixing said fluid;

adding the TDI capped polyether to the fluid to form a first composition;

injecting said composition into a preheated mold and holding for a first predetermined time period until gelled;

placing said mold into an oven at a second predetermined temperature for a second predetermined time period to develop sufficient polyurethane green strength;

demolding by removing the caul sheet; and placing said polyurethane into a curing oven at a third predetermined temperature for a third predetermined time period.

* * * * *